Dec. 14, 1937.   A. WALTERSPIEL   2,101,967
ROASTING, TOASTING, GRILLING, AND COOKING APPARATUS
Filed Oct. 13, 1934   3 Sheets-Sheet 1
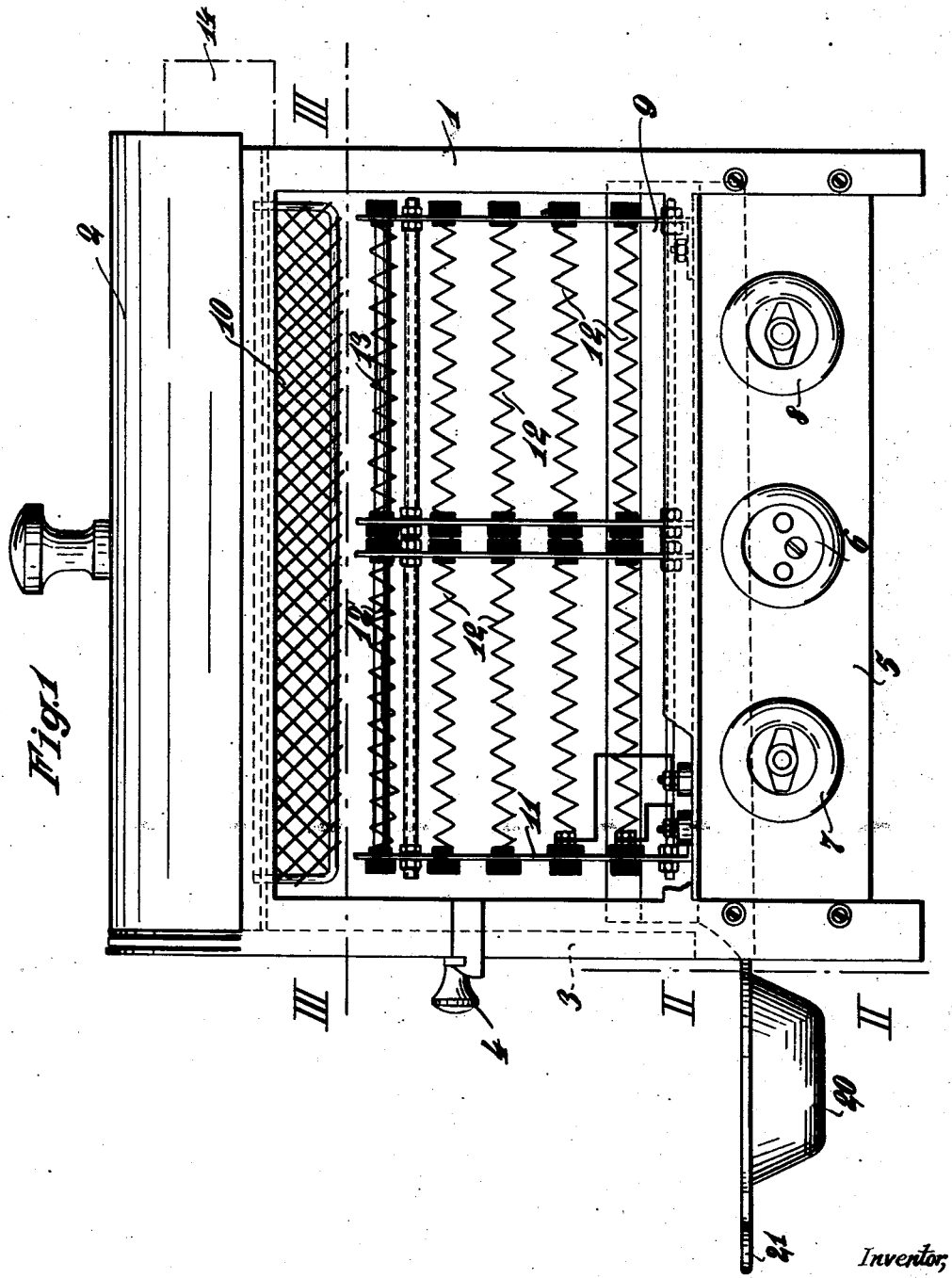
Inventor,
A. Walterspiel.
By William C. Linton.
Attorney.

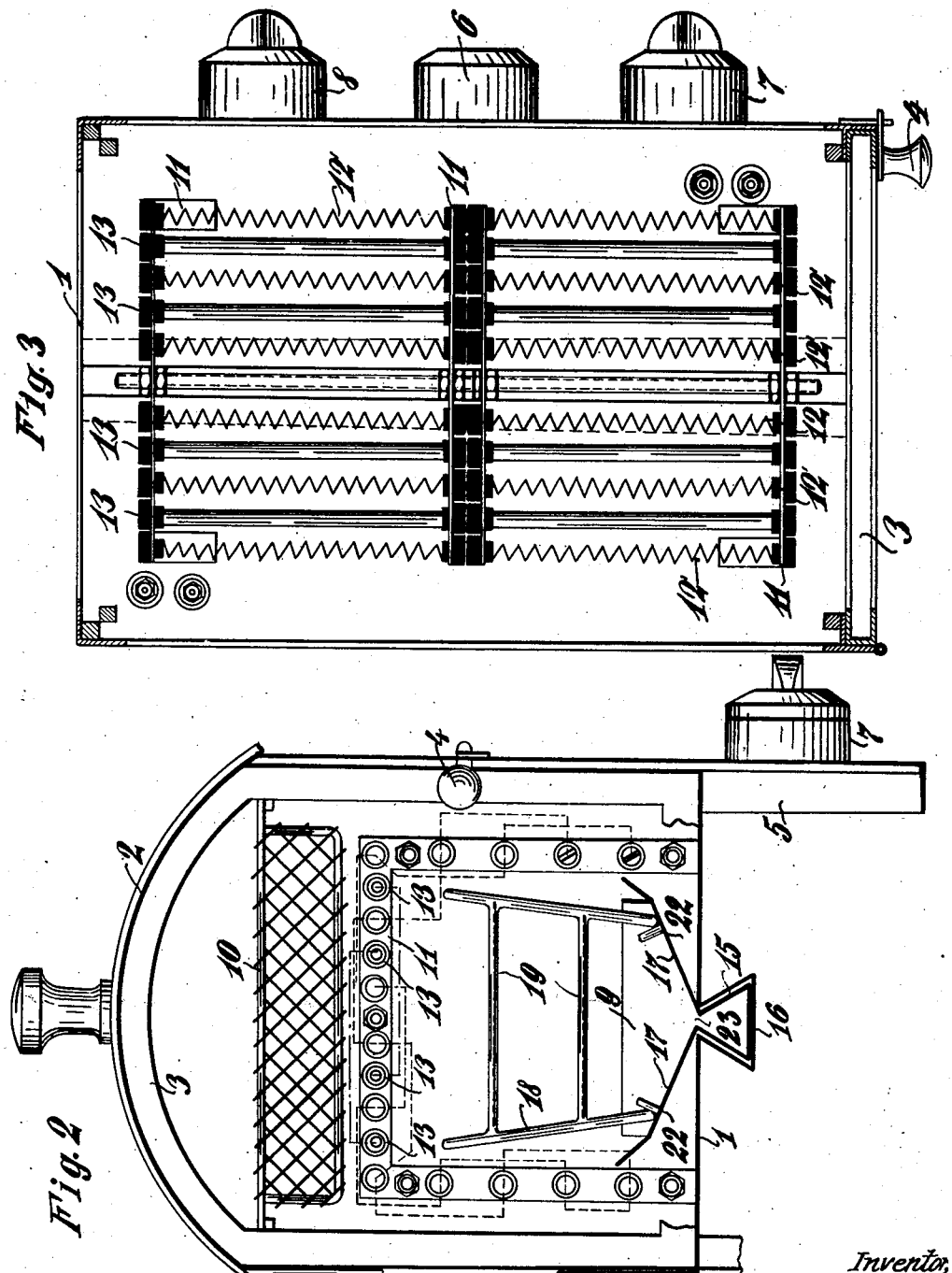

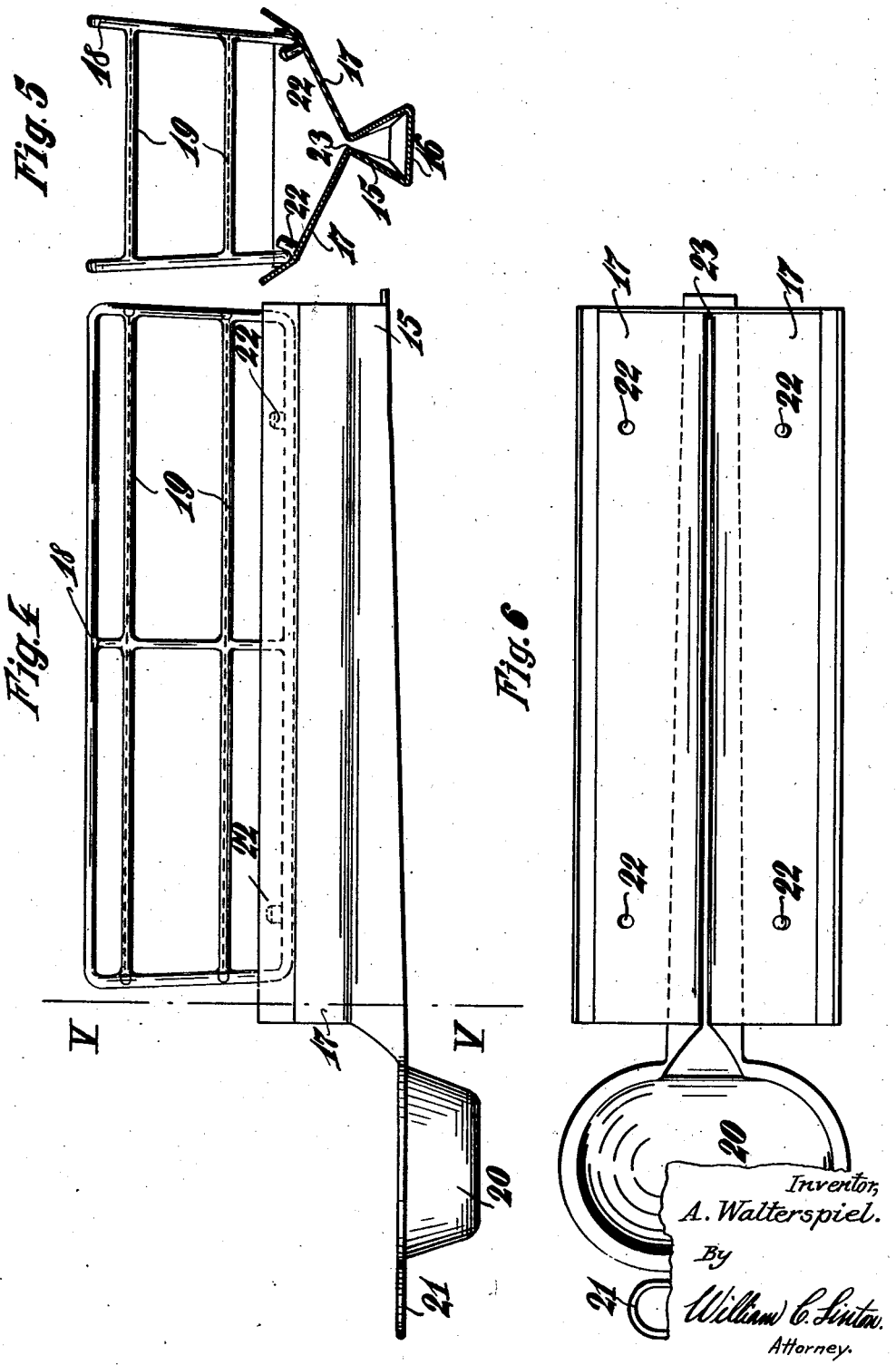

Patented Dec. 14, 1937

2,101,967

UNITED STATES PATENT OFFICE 2,101,967

ROASTING, TOASTING, GRILLING, AND COOKING APPARATUS

Alfred Walterspiel, Munich, Germany

Application October 13, 1934, Serial No. 748,249
In Germany December 13, 1933

14 Claims. (Cl. 219—35)

The present specification refers to a roasting, toasting, grilling and cooking apparatus adapted especially for the household and for travellers. The roasting and grilling devices according to the prior art were little adapted for household purposes, having in most cases a high current consumption and therefore necessitating a separate power circuit, further disadvantages being the smell of burning caused by the fatty and albuminoid substances oozing or dripping out of the meat, this smell naturally imparting a similar taste to the piece being roasted, and also the difficulty of operation and maintenance, such devices being generally very troublesome to cleanse.

All these disadvantages have been eliminated in the apparatus according to the present invention, which in one embodiment consists essentially of an outer casing in box-form, containing a removable two-step heating element in the shape of a tunnel, a drawer-like false bottom adapted to receive the carriers or frames for the piece of meat or other article of food, a basket-like receptacle for hanging in the case, this receptacle being interchangeable with a pan, or with an insert piece adapted to store heat, and finally a cover for the device. The heating device comprises a double system of heating elements, these being a tunnel-like system of heating wires and a high heat system arranged at the top of the tunnel. These two heating systems can be switched-off and -on quite independently of each other. Sylit, baker or similar heating rods may be employed with advantage for the high heat system.

The device according to the present invention is therefore adapted to heat not only articles of food within the tunnel, but also wire sieves or baskets, or pans, pots or the like inserted at the top of the apparatus; in the latter case the high heat system (sylit system) alone will be switched-on. If it is desired to keep the food warm for an extended period, then insert pieces adapted for storing heat, for instance, fire bricks or the like, may be placed in the top of the apparatus. Such insert pieces will radiate their stored heat after the current has been switched-off, the apparatus then operating as a heat accumulator. The walls of the apparatus may be made of glass, mica, sheet iron, or any other suitable material. It is especially advisable to provide the apparatus with badly heat conducting substances, such as, e. g., asbestos plates. It is recommended to provide these plates (wall plates) on the inner side with a reflecting coating, for instance, metal walls may be chromium plated, this having the advantage that the walls will reflect and not absorb the heat and also that the entire apparatus will be easier to keep clean. The bottom of the apparatus is provided with a narrow slit for draining off the fat dripping out of the meat, which fat passes into a gutter or channel and is immediately removed from the heated space, said channel ending in a drip pan outside the apparatus, from where said fat can be scooped up as required. The above-mentioned slit in the bottom of the apparatus also serves to admit fresh air, which is gradually warmed up on its way into the interior, the emerging fat being at the same time cooled. An exit for the warm air is provided at the top of the apparatus. A small chimney may also be provided, but this is in no wise necessary.

The carriers for the piece to be roasted are in the form of simple grids serving as a bed for the joint or roast; these grids will be provided of different heights corresponding to the different sizes of the pieces of meat or poultry to be cooked. For grilling purposes, these grids may be turned upside down. Different heights are provided, so that the piece of meat to be grilled can always be arranged in the apparatus in close proximity to the upper heat.

The device according to the present invention may be provided with different insert pieces; for instance, with a fire brick insert for storing and afterwards slowly radiating the heat; instead of fire brick, any other material adapted to store heat may be employed; or with a basket insert for quickly toasting bread, or roasting chestnuts or potatoes in their skins; or a frying pan for food stuffs to be fried in fat, for instance, meat dressed with egg and bread crumbs (cutlets and the like); or an insert for stewing vegetables, for cooking fish or other articles of food. This last mentioned insert at the same time serves as cover for the apparatus.

During roasting, poultry does not lie in fat, and is therefore easier to digest. Grilled meat, for instance, a beefsteak, is done in half the time usually necessary on the customary charcoal grill, because it is surrounded by heat on all sides and it will be done in a few minutes, a fine brown crust being formed by the increased upper heating. By turning it over at half time, the other side will also be done brown and savoury.

The device according to the present invention is not only hygienic in a high degree and fulfils all requirements with regard to savouriness of the food cooked, but is also very economical in use, because meat can be roasted in the lower part of the apparatus and at the same time potatoes cooked, vegetables stewed, or asparagus prepared in the upper part, the heat required for roasting the meat sufficing to simultaneously cook the other articles of food.

With the help of this apparatus, anyone can quickly and easily prepare his dinner or supper at a minimum of cost. The device is ready for use immediately after switching-on the current and the moment the current is again switched-off, no heat can be wasted.

Reference being made to the accompanying drawings, one form of construction of the device according to the present invention is shown by way of example.

Fig. 1 is a side view of the device, with walls removed or assumed to be transparent;

Fig. 2 a front view, the channel for draining off the fat being cut along the line II—II in Fig. 1;

Fig. 3 a horizontal section at line III—III in Fig. 1;

Fig. 4 a side view of the false bottom with carrier for the piece of meat to be roasted;

Fig. 5 a front view of the false bottom with carrier, cut along the line V—V in Fig. 4;

Fig. 6 a plan view of the false bottom.

The form of construction shown in the above drawings consists of a cubical housing 1, provided with a removable cover 2. At the front of the housing 1 is a door 3 provided with a latch or bolt 4. The lower part 5 of the device contains the electric leads 6 and switches 7 and 8 and is further adapted to hold the false bottom 9 shown in detail in Figs. 4, 5 and 6. False bottom 9 is of dovetailed section fitting into a corresponding track or guide way in the lower part of the apparatus, so that it can be easily pulled-out or pushed-in.

The walls of the apparatus may be made of glass or of an insulating material. The upper part of the apparatus is adapted to hold different insert pieces 10, such as baskets, grids or the like for the reception of food articles, such as bread, potatoes, pieces to be grilled, etc., or a heat storing element. Access to this upper part is gained not through the door of the apparatus, but from the top after raising or lifting-off cover 2. In the interior of the device is arranged a frame 11 shaped like a tunnel as carrier for the heating wires 12. Besides these heating wires, the frame or tunnel 11 also contains at the top a number of sylit rods 13 capable of being heated to a high temperature. These sylit rods serve not only to produce the superficial browning required for many dishes, but also for heating the insert baskets or heat storing element 10. The heating wires may, for instance, be connected up to switch 7 and the sylit rods to switch 8, so that these two systems can be switched on and off independently of each other. If desired, the frame or tunnel 11 may be firmly attached to the apparatus, but it will be found more advantageous to secure said tunnel in its place with the help of pins or the like and also to effect the electric connections to the heating elements by means of similar pins or plugs, this greatly facilitating the removal of the tunnel for purposes of cleaning. The apparatus is further provided with a connection 14 for a chimney. The false bottom 9 itself consists of a triangular gutter or channel 15, the base 16 of the triangle forming the bottom of the gutter, on which are arranged two wings 17 extending over the entire width of the tunnel. The different carriers 18 for the meat to be roasted rest on these wings 17; said carriers are in the form of slides or sledges, and are provided with one or more bars, nets, or the like 19 for the reception of the piece to be roasted, these bars or nets being, however, arranged at different heights, so that by differently disposing or turning the carriers, the distance between the piece of meat and the heating wires 12' and sylit rods 13 can be adjusted according to requirements. As already mentioned, instead of insert baskets or grids 10, a heat storing element may be inserted at the top of the apparatus, such element consisting for instance of fire bricks and being adapted to store the heat and afterwards to slowly radiate it, thus keeping the food warm until it can be served. The gutter 15, 16 projects beyond the front of the apparatus and ends in a drip pan 20 for collecting the emerging fat; this drip pan is entirely outside the apparatus. Grip 21 serves to more easily handle the false bottom 9.

The method of operation of this apparatus is as follows:

The apparatus may be preheated or not, as desired. The ready dressed piece to be roasted is placed on one of the meat carriers 18, the false bottom then drawn out of the apparatus and carrier 18 with the piece placed in position on the false bottom. As already mentioned, different carriers 18 are provided according to the intensity of heating required. Pins 22 on the wings 17 serve to keep the carrier reliably in position. The false bottom with the carrier and meat is now pushed into the apparatus and door 3 closed and secured with latch or bolt 4. If the walls of the apparatus are transparent, then the process of roasting can be easily observed from the outside; but if the walls are not transparent, it is recommended to provide a window. When the piece is done and it is desired to brown it superficially, it is only necessary to switch-on the sylit rods for a short period. To prepare toast, to cook potatoes, to stew vegetables and the like, an insert piece 10, for instance, a wire basket, a frying pan or pot are arranged in the upper part of the apparatus.

The fat oozing out of the piece of meat drips on to wings 17 of the false bottom and, these being warm, said fat will run off through slit 23 and drip on to gutter bottom 16, which latter slants downwards towards the front of the apparatus. In this gutter the liquid fat is protected by the narrowness of slit 23 from the action of the heating elements, so that a burning of this fat with the consequent unpleasant smell is entirely obviated. The liquid fat now runs along the gutter bottom 16 and is collected in drip pan 20, from where it can be removed from time to time and employed for different purposes, for instance, for basting the roast. For this latter purpose, it is necessary to open door 3 and to draw out the false bottom with the meat carrier, grip 21 being used as handle. The fat can never be wasted, since all superfluous fat again drips off the roast and passes through slit 23 to drip pan 20.

In order to place a piece of meat or other article of food in one of the insert pieces 10, the cover 2 of the apparatus must be opened. The removal of said piece after cooking is effected in the same way.

Various embodiments of my invention have been described and shown in the drawings, but I do not desire to be limited to these specific embodiments; and the particular embodiments of my invention may be variously changed and modified without departing from the spirit of the invention as set forth in the following claims.

I claim:

1. A cooking apparatus comprising a housing having restricted openings in the top and bottom thereof, heating means within said housing arranged in vertical parallel planes adjacent to the vertical walls of the housing, means supporting material to be heated within said planes, and heating means within said housing and arranged in a horizontal plane above said vertical heating means, the vertical and horizontal heating means forming an inverted U and the horizontal heating means being arranged below the top of the housing to allow the heat to gather below the top of the housing and the horizontal heating means, said inverted U-shaped heating means being adapted to include therein an article to be cooked and said horizontal portion thereof being adapted to heat articles placed above the same.

2. A cooking apparatus comprising an elongated housing, heating means within said housing arranged in a tunnel-like form with side walls and top wall formed by said heating means, the side walls of the heating means being adjacent said side walls of the housing, and the top wall being substantially midway in the elongated housing, said heating means extending substantially the length of the elongated housing, means supporting material to be heated above the top wall, and means supporting material to be heated below said top wall.

3. A cooking apparatus comprising an elongated housing, heating means within said housing arranged in a tunnel-like form with side walls and top wall formed by said heating means, the side walls of the heating means being adjacent said side walls of the housing, and the top wall being substantially midway in the elongated housing, said heating means extending substantially the length of the elongated housing, means supporting material to be heated above the top wall, and means supporting material to be heated below said top wall, said tunnel shaped heating means being insertable and removable from the interior of said housing.

4. A cooking apparatus comprising a housing, heating means within said housing, means supporting material to be heated within said housing, a base plate for said housing having a narrow restricted opening lengthwise of the base plate, and a false bottom passing through said opening and extending within and without said housing, said false bottom within the housing being adapted to receive the drippings of the material being heated, and to guide the same to the exterior of the housing, and said false bottom being movable in the narrow opening to remove the false bottom from the housing.

5. A cooking apparatus comprising a housing, heating means within said housing, means supporting material to be heated within said housing, a base plate for said housing having a narrow restricted opening lengthwise of the base plate, and a false bottom within the housing and having an extension passing through the narrow restricted opening of the base plate, said extension being exterior to the housing, said false bottom within the housing being adapted to receive the drippings of the material being heated, and to guide the same to the exterior of the housing, and said false bottom being movable in the narrow opening to remove the false bottom from the housing.

6. A cooking apparatus comprising a housing, heating means within said housing, means supporting material to be heated within said housing, a base plate for said housing having a narrow restricted opening lengthwise of the base plate, and a false bottom within the housing and having an extension passing through the narrow restricted opening of the base plate, said extension being exterior to the housing, said false bottom having inclined walls converging towards a channel-like space between said walls, said false bottom within the housing being adapted to receive the drippings of the material being heated, and to guide the same to the exterior of the housing, and said false bottom being movable in the narrow opening to remove the false bottom from the housing.

7. A cooking apparatus comprising a housing, heating means within said housing, means supporting material to be heated within said housing, a base plate for said housing having a narrow restricted opening lengthwise of the base plate, and a false bottom within the housing and having an extension passing through the narrow restricted opening of the base plate, said extension being exterior to the housing, said false bottom having inclined walls converging towards a channel-like space between said walls and having upwardly extending flaring walls beyond said inclined walls, said false bottom within the housing being adapted to receive the drippings of the material being heated, and to guide the same to the exterior of the housing, and said false bottom being movable in the narrow opening to remove the false bottom from the housing.

8. A cooking apparatus comprising a housing, heating means within said housing, means supporting material to be heated within said housing, a base plate for said housing having a narrow restricted opening lengthwise of the base plate, a false bottom within the housing and having an extension passing through the narrow restricted opening of the base plate, said extension being exterior to the housing, said false bottom having inclined walls converging towards a channel-like space between said walls, and means on said false bottom for supporting material to be heated, said false bottom acting to collect the drippings from said material and guide the same exterior to said housing, said false bottom within the housing being adapted to receive the drippings of the material being heated, and to guide the same to the exterior of the housing, and said false bottom being movable in the narrow opening to remove the false bottom from the housing.

9. A cooking apparatus comprising a housing, heating means within said housing, means supporting material to be heated within said housing, a base plate for said housing having a narrow restricted opening lengthwise of the base plate, a false bottom within the housing and having an extension passing through the narrow restricted opening of the base plate, said extension being exterior to the housing, said false bottom having inclined walls converging towards a channel-like space between said walls, means on said false bottom for supporting material to be heated, said false bottom acting to collect the drippings from said material and guide the same exterior to said housing, and a collecting pan at one end of said false bottom exterior to the housing, said false bottom within the housing being adapted to receive the drippings of the material being heated, and to guide the same to the exterior of the housing, and said false bottom being movable in the narrow opening to remove the false bottom from the housing.

10. A cooking apparatus comprising a housing, heating means within said housing, means supporting material to be heated within said housing, a base plate for said housing having a narrow restricted opening lengthwise of the base plate, and a false bottom having inclined converging walls within the housing and extension walls outside of the housing forming a drip pan, having a narrow restricted slit between the inclined converging walls, said slit forming the sole means for air communication between the exterior and interior of the housing in the base plate, said false bottom within the housing being adapted to receive the drippings of the material being heated, and to guide the same to the exterior of the housing, and said false bottom being movable in the narrow opening to remove the false bottom from the housing.

11. A cooking apparatus comprising a housing, heating means within said housing, means supporting material to be heated within said housing, a base plate for said housing having a narrow restricted opening lengthwise of the base plate, and a false bottom having inclined converging walls within the housing and extension walls outside of the housing forming a drip pan adapted to receive the drippings from the material being heated, having a narrow restricted slit between the inclined converging walls, said slit being adapted to permit the drippings to flow therethrough into the said extension outside the housing and said slit forming the sole means for air communication between the exterior and interior of the housing in the base plate, said false bottom being insertable in and removable from the opening in the base plate.

12. A cooking apparatus having a base plate and comprising a housing having a transparent wall, U-shaped electric heating means within said housing, material supporting means above and within said U-shaped electric heating means, the base plate being provided with a slot along the length of the housing, a false bottom extending within the housing and below the material being heated within the U-shaped electric heating means, and an extending exterior to said housing and forming a drip pan, the juncture of the portions extending interior and exterior of the housing having a narrow slit, being the sole communication of air exterior and interior of the casing, in the lower part of the apparatus.

13. A cooking apparatus comprising a housing, electrical heating means within said housing and arranged in parallel vertical planes adjacent the lateral vertical walls of the housing, electrical heating means arranged in a horizontal plane immediately above the vertically arranged heating means forming an inverted U therewith, means for supporting material to be heated between said vertical planes, and means for supporting material to be heated over said horizontal plane, said horizontal heating means being of higher heat giving power than the vertically arranged heating means, whereby part of the heat of the horizontal heating means descends and enters between the vertical heating means.

14. A cooking apparatus comprising a housing, heating means within said housing arranged in parallel vertical planes, means supporting material to be heated within said planes, a second heating means within said housing arranged in a horizontal plane above said vertical heating means, said housing having a base plate with a restricted opening, a false bottom within said housing situated between the vertically arranged heating means and below the horizontally arranged heating means, and an extension on said false bottom passing through said restricted opening to the outside of the housing in contact with the air exterior to the housing, said false bottom within the housing being adapted to receive the drippings of the material being heated, and to guide the same to the exterior of the housing, and said false bottom being movable in the narrow opening to remove the false bottom from the housing.

ALFRED WALTERSPIEL.